US007994825B2

(12) United States Patent
Ushio et al.

(10) Patent No.: US 7,994,825 B2
(45) Date of Patent: Aug. 9, 2011

(54) SERIAL OUTPUT CIRCUIT, SEMICONDUCTOR DEVICE, AND SERIAL TRANSMISSION METHOD

(75) Inventors: Yuji Ushio, Ome (JP); Takashi Muto, Hamura (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 12/843,957

(22) Filed: Jul. 27, 2010

(65) Prior Publication Data

US 2011/0074461 A1 Mar. 31, 2011

(30) Foreign Application Priority Data

Sep. 28, 2009 (JP) ................................ 2009-221906

(51) Int. Cl.
*H03K 19/20* (2006.01)
(52) U.S. Cl. ........................ 326/115; 326/119; 326/27
(58) Field of Classification Search .................... 326/21, 326/26, 27, 112, 113, 115, 119–122
See application file for complete search history.

(56) References Cited

U.S. PATENT DOCUMENTS

| 6,518,792 B2 * | 2/2003 | Jong et al. ........................ 326/87 |
| 7,288,971 B1 * | 10/2007 | Plasterer et al. .............. 326/127 |
| 7,304,504 B2 * | 12/2007 | Kang et al. ...................... 326/87 |
| 7,812,643 B2 * | 10/2010 | Govindu et al. .............. 326/115 |

FOREIGN PATENT DOCUMENTS

JP 2008-227991 A 9/2008

* cited by examiner

*Primary Examiner* — James Cho
(74) *Attorney, Agent, or Firm* — Miles & Stockbridge P.C.

(57) ABSTRACT

In an output circuit having a de-emphasis for use in high-speed serial transmission, a circuit for suppressing a fluctuation of a common mode potential which occurs in output amplitude is provided. A positive pole and a negative pole of an output circuit in a serial transmission device for differential transmission having de-emphasis are connected to the respective outputs of a differential circuit that differentially receives outputs of a detector device for a pattern of data to be transmitted, and a detector device for an inverted pattern of the data to be transmitted. When a specific pattern of data to be transmitted and its reverted pattern appear, a current of the output circuit is compensated by the connected differential circuit, thereby enabling a common mode noise to be prevented.

13 Claims, 12 Drawing Sheets

SERIAL OUTPUT CIRCUIT, SEMICONDUCTOR DEVICE, AND SERIAL TRANSMISSION METHOD

CLAIM OF PRIORITY

The present application claims priority from Japanese patent application JP 2009-221906 filed on Sep. 28, 2009, the content of which is hereby incorporated by reference into this application.

FIELD OF THE INVENTION

The present invention relates to a serial output circuit, a semiconductor device having the serial output circuit, and a serial transmission method.

BACKGROUND OF THE INVENTION

Serial transmission is one of data transfer forms that is executed in a data transfer system that is configured by an output circuit that transmits a data signal, a transmission channel through which the data signal passes, and an input circuit that receives the data signal. In the recent advanced information society, a high-speed data transfer technique is essential because of an increase in information capacity, and data transfer high in speed and low in data error rate is required for serial transmission. In order to realize such a technique, there is required to remove noise from the data signal to be transferred as much as possible. This is because in the data transfer environment with much noise, when the data signal is determined, the amplitude in the voltage direction is small, and the margin on the time axis is also small, thereby increasing the data error rate.

JP-A-2008-227991 discloses a technique for solving such problem that, in the serial transmission, when identical data continues, uplift occurs in the waveform of an output amplitude, and the amount of uplift becomes larger than half of the amplitude so as not to normally receive the data. In the technique, there is provided an identical-data continuation detector circuit, and an output of the identical-data continuation detector circuit is inputted to a driver circuit having a capacitor. When identical data continues, the driver circuit narrows the output amplitude so as to prevent the waveform from being uplifted at a receiver side.

SUMMARY OF THE INVENTION

As one type of the noise in the serial transmission, there is a common mode noise that occurs when the center potential of the data signal oscillates. The common mode noise means an in-phase noise that occurs when an in-phase current flows into both poles of positive and negative outputs which are called "positive pole" and "negative pole" in the case where differential transmission is conducted. The common mode potential is defined by (Vop+Von)/2. Vop denotes an output potential of the positive pole, and Von represents an output potential of the negative pole. In order to prevent the common mode noise, there is a need to suppress the fluctuation of the center potential, that is, the common mode potential of the data signal.

FIG. 10 shows a serial output circuit having a current mode logic (CML) circuit of the CMOS type. The serial output circuit in FIG. 10 is used, for example, in an interface (I/F) of serial transmission between integrated circuits. The CML circuit can switch a current without using an unsaturated region of a transistor, so as to respond to the higher transmission speed. With a reduction in the voltage of an LSI, the voltage of the I/F circuit also decreases. However, in the transmission at a high frequency, because the loss of a transmission line also increases, it is difficult to largely decrease the output voltage of the output circuit. For example, in a PCI-express that is one of the serial transmission standards, a differential output amplitude=800 mV to 1200 mV is standardized. Also, de-emphasis that is a waveform equalization technique is conducted in the serial output circuit. Because de-emphasis is conducted, the output voltage level fluctuates during transmission of data depending on a pattern of the data signal. For that reason, in the CML circuit system, a drain-source potential Vds3 of a current source MOS (MN3) fluctuates with a variation in the output voltage level regardless of a coupling system of AC coupling or DC coupling between the I/Fs.

In recent years, a reduction in a power supply voltage for use in the I/F is advanced, thereby making it difficult to completely design the current source MOS (MN3) in only a saturated region. As shown in FIG. 11, when the current source MOS (NM3) is used in the unsaturated region, Vds3 fluctuates due to a variation in the output voltage level, and a current value Ids3 that flows in the current source MOS (NM3) fluctuates as indicated by ΔIds3 from a desired design value. For example, in order to output the output amplitude 800 to 1200 mV which is described in the serial transmission standards, there is a need to use the current source MOS (MN3) of the CML shown in FIG. 10 with the I-V characteristic of the unsaturated region shown in FIG. 11. Accordingly, a current that flows in the current source MOS (NM3) fluctuates with a variation in the output voltage level, and the output voltage level is deviated from the design value. The deviation of the output voltage level causes the common mode potential to fluctuate.

Since the transmission loss of the data signal increases more as the data signal alternates "0" and "1" at a higher speed, the output waveform is outputted with the output amplitude as large as possible. Accordingly, there is a tendency that the lower-voltage side outputs of the positive pole and the negative pole of the serial output circuit become lower when the data signal becomes higher in the transmission speed. When the lower-voltage side outputs are lower, Vds3 becomes smaller. When Vds3 becomes smaller, a difference ΔIds3 from the desired Ids3 becomes larger. When ΔIds3 is larger, a fluctuation of the output level becomes larger, and the common mode noise becomes larger. The transfer speed of the data signal depends on a pattern of transmission data that how many bits continue until the data signal of "0" or "1" alternates. That is, the transfer speed of the data signal is different according to the pattern of transmission data. Accordingly, the common mode noise strongly occurs due to the appearance of a specific pattern of transmission data.

Also, when the common mode noise depending on the specific pattern of the data signal occurs in one of the positive pole and the negative pole, the common mode noise also occurs in the other pole with respect to its inverted pattern of the data signal. That is, when a given pattern causes the common mode noise, its inverted pattern also causes the common mode noise, likewise. Also, the magnitude of the common mode noise is substantially identical between the pattern and the inverted pattern from the viewpoint of the characteristic of the circuit.

The present invention has been made in view of the above problem, and therefore an object of the present invention is to suppress a fluctuation of the common mode potential of an output circuit having de-emphasis, which is caused by the pattern of the signal data.

Among various aspects of the present invention disclosed in the present application, the outline of a typical aspect will be described in brief below.

That is, in order to achieve the object, an output of a differential circuit that differentially inputs the respective outputs of a detection device for a pattern of transmission data and a detection device for an inverted pattern of transmission data is connected to a positive pole and a negative pole of an output circuit in a serial transmission device for differential transmission having de-emphasis. A current of the output circuit is compensated by the connected differential circuit when a specific pattern of transmission data and its inverted pattern occur, thereby enabling the common mode noise to be prevented.

According to the present invention, the serial transmission that suppresses the common mode noise that is caused by the pattern of transmission data can be realized. Accordingly, the high-speed serial transmission small in the data error rate under the low noise environment can be realized.

DETAILED DESCRIPTION OF THE PREFERRED EMBODIMENTS

Hereinafter, embodiments of the present invention will be described in detail with reference to the accompanying drawings.

First Embodiment

A transmission system that combines a feed forward equalizer of a transmitter side integrated circuit and a decision feedback equalizer of a receiver side integrated circuit together can be applied to a transmission system that conducts data transfer between integrated circuits.

Figure 1:
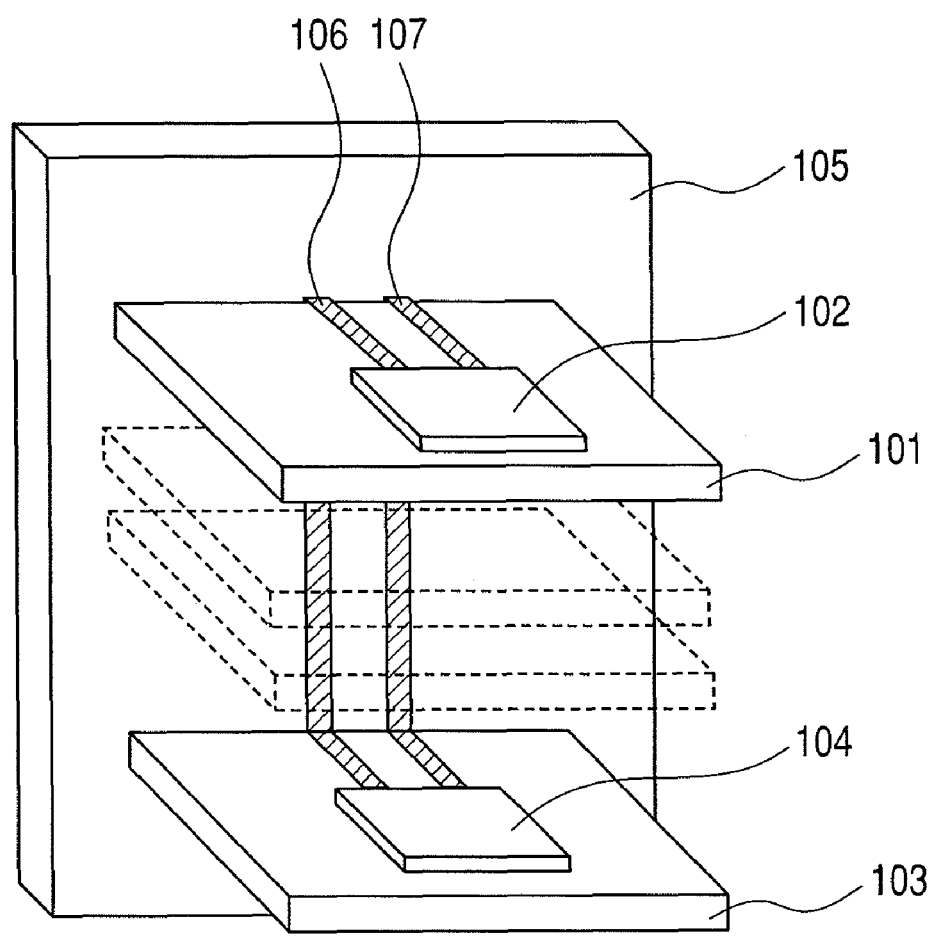
FIG. 1 is a diagram illustrating an example of a semiconductor device having plural integrated circuits that transfer data to each other.

FIG. 1 is a diagram showing an example of a semiconductor device having plural integrated circuits that transfer data to each other. The semiconductor device according to a first embodiment shown in FIG. 1 includes an integrated circuit (LSI) 102 on a daughter board 101, and an integrated circuit (LSI) 104 on a daughter board 103. Each of the integrated circuit 102 and the integrated circuit 104 includes a serializer/deserializer circuit as one of circuits provided thereon. Each of the daughter board 101 and the daughter board 103 is one type of printed circuit boards, and so designed as to mount an integrated circuit thereon and to be inserted into a connector on a back plane 105. The back plane 105 is one type of the printed circuit boards, has plural connectors, functions as a base for correctly connecting those connectors to each other, and connects the plural printed circuit boards such as the daughter boards to each other. When extensions are conducted, a daughter board on which an integrated circuit having a necessary function is mounted is connected to a free connector. Data that has been output from the integrated circuit 102 on the daughter board 101 is inputted to the integrated circuit 104 through a signal line 106 that has been printed on the daughter board 101, the back plane 105, and the daughter board 103. Conversely, data that has been output from the integrated circuit 104 is inputted to the integrated circuit 102 through a signal line 107. That is, data is transferred between the integrated circuit 102 and the integrated circuit 104 through the signal line 106 and the signal line 107 which are transmission channels.

Figure 2:
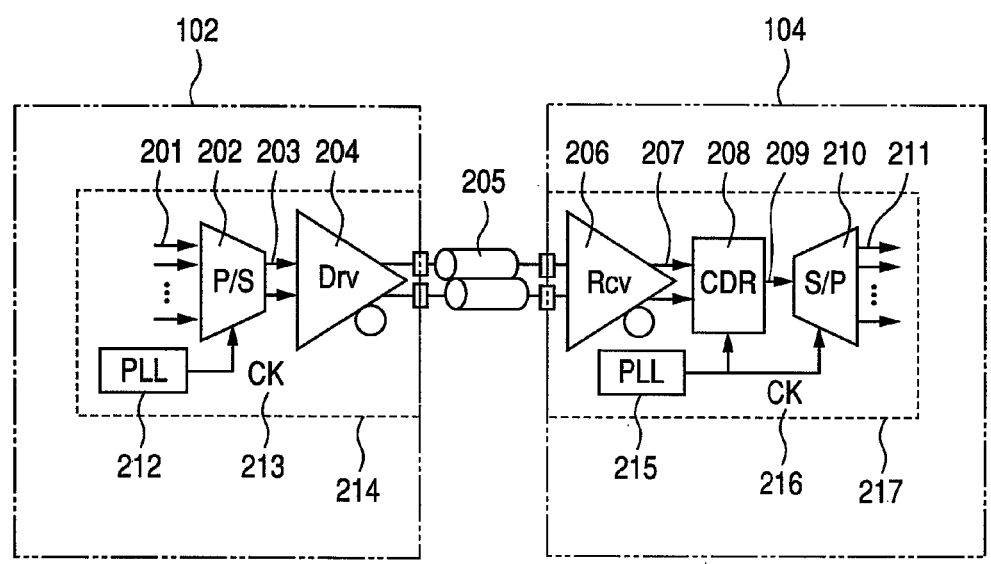
FIG. 2 is a diagram illustrating the configuration of a transmission system that transfers data from one integrated circuit to another integrated circuit.

FIG. 2 is a diagram showing the configuration of a transmission system that transfers data from the integrated circuit 102 to the integrated circuit 104 through the signal line 106. The integrated circuit 102 on a transmitter side includes a transmitter side serializer/deserializer circuit (SerDes) 214.

The transmitter side serializer/deserializer circuit 214 includes a parallel/serial data converter circuit (P/S) 202, an output circuit (Drv) 204, and a phase locked loop (PLL) 212.

A receiver side serializer/de-serializer circuit 217 includes an input circuit (Rcv) 206, a clock data recovery circuit (CDR) 208, a serial/parallel data converter circuit (S/P) 210, and a phase locked loop (PLL) 215.

The phase locked loop (PLL) 212 supplies a clock (CK) 213 to the parallel/serial data converter circuit (P/S) 202 and the output circuit (Dry) 204. The parallel/serial data converter circuit (P/S) 202 converts parallel data 201 into serial data 203 on the basis of the clock (CK) 213. The output circuit (Drv) 204 outputs the serial data 203 that has been input from the parallel/serial data converter circuit (P/S) 202 to a transmission channel 205.

The phase locked loop (PLL) 215 supplies a clock (CK) 216 to the clock data recovery circuit (CDR) 208 and the serial/parallel data converter circuit (S/P) 210. The input circuit (Rcv) 206 amplifies serial data that has been input thereto through the transmission channel 205. The clock data recovery circuit (CDR) 208 adjusts a positional relationship between serial data 207 from the input circuit (Rcv) 206 and the supplied the clock (CK) 216 to recover serial data 209, and outputs the serial data 209 to the serial/parallel data converter circuit (S/P) 210. The serial/parallel data converter circuit (S/P) 210 converts the serial data 209 into parallel data 211, and supplies the parallel data 211 to the inside of the receiver side integrated circuit 104.

Figure 3:
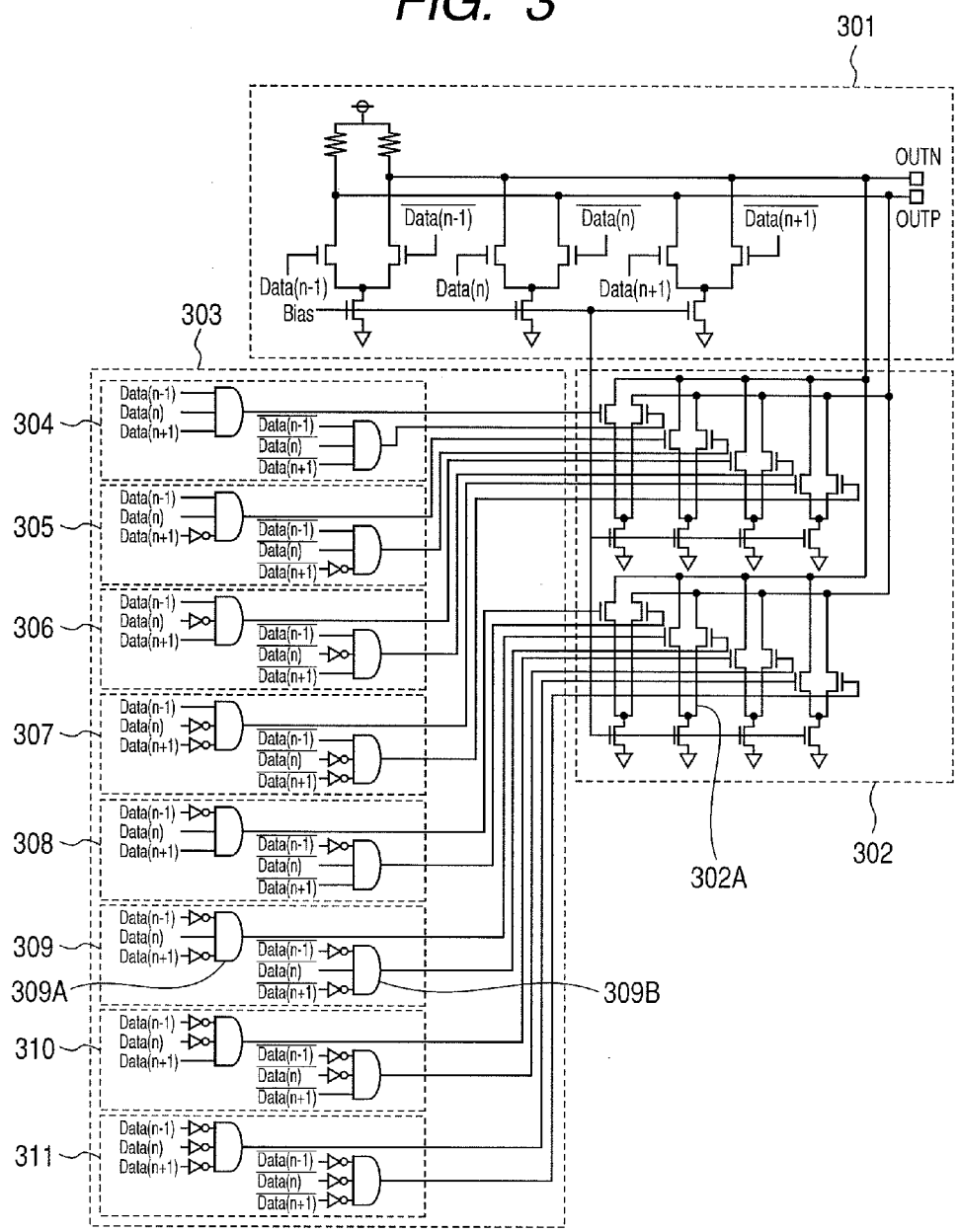
FIG. 3 is a diagram illustrating an example of an output circuit according to a first embodiment.

FIG. 3 is a diagram showing the detail configuration of the output circuit 204. The output circuit 204 includes an output amplitude generator circuit 301, an output amplitude correction circuit 302, a data detector circuit 303, an arithmetic logic circuit 304, an arithmetic logic circuit 305, an arithmetic logic circuit 306, an arithmetic logic circuit 307, an arithmetic logic circuit 308, an arithmetic logic circuit 309, an arithmetic logic circuit 310, and an arithmetic logic circuit 311.

The output amplitude generator circuit 301 is a differential circuit that has a de-emphasis function of 3TAP and outputs a signal of serial transmission to the positive pole and the negative pole. That is, each of the positive pole and the negative pole is connected with a differential output of the differential circuit which is the de-emphasis circuit. The output amplitude correction circuit 302 is a differential circuit having outputs connected to the positive pole and the negative pole of the output amplitude generator circuit 301, which allows a correction current to additionally flows into the output amplitude generator circuit 301 so that the common mode potential does not fluctuate by the de-emphasis operation. The data detector circuit 303 detects the data 203 to be transmitted, and transmits the detection information to the output amplitude correction circuit 302. In order to correct a positive-pole side output voltage and a negative-pole side output voltage with respect to eight kinds of data to be transmitted, and their inverted data by the arithmetic logic circuit 304, the arithmetic logic circuit 305, the arithmetic logic circuit 306, the arithmetic logic circuit 307, the arithmetic logic circuit 308, the arithmetic logic circuit 309, the arithmetic logic circuit 310, and the arithmetic logic circuit 310, the data detector circuit 303 has eight arithmetic logic circuits for each of the positive pole and the negative pole, that is, includes 16 arithmetic logic circuits in total.

The arithmetic logic circuit 309 which is a pattern detector device for the data 203 to be transmitted transmits signals to differential inputs of the output amplitude correction circuit 302 which is a differential circuit when " . . . 010 . . . " which is a pattern of the data 203 to be transmitted, or " . . . 101 . . . " which is its inverted pattern is inputted to the arithmetic logic circuit 309. A differential circuit 302A differentially receives the output of a circuit 309A that outputs a signal when the data signal " . . . 010 . . . " is inputted to the circuit 309A, and the output of a circuit 309B that outputs a signal when the data signal " . . . 101 . . . " is inputted to the circuit 309B. Since there is no change in the required correction amount of the differential output between the pattern of the data 203 to be transmitted and its inverted pattern, noise can be stably suppressed by the differential input with the use of the same current source. Also, since there is no need to prepare individual current sources for the respective circuits 309A and 309B, excessive area consumption can be suppressed.

Likewise, the arithmetic logic circuit 304 is a circuit that transmits the signal for allowing the correction current to flow into the output amplitude correction circuit 302 when receiving a pattern " . . . 111 . . . " or its inverted pattern " . . . 000 . . . ". The arithmetic logic circuit 305 is a circuit that transmits the signal for allowing the correction current to flow into the output amplitude correction circuit 302 when receiving a pattern " . . . 110 . . . " or its inverted pattern " . . . 001 . . . ". The arithmetic logic circuit 306 is a circuit that transmits the signal for allowing the correction current to flow into the output amplitude correction circuit 302 when receiving a pattern " . . . 101 . . . " or its inverted pattern " . . . 010 . . . ". The arithmetic logic circuit 307 is a circuit that transmits the signal for allowing the correction current to flow into the output amplitude correction circuit 302 when receiving a pattern " . . . 100 . . . " or its inverted pattern " . . . 001 . . . ". The arithmetic logic circuit 308 is a circuit that transmits the signal for allowing the correction current to flow into the output amplitude correction circuit 302 when receiving a pattern " . . . 011 . . . " or its inverted pattern " . . . 100 . . . ". The arithmetic logic circuit 310 is a circuit that transmits the signal for allowing the correction current to flow into the output amplitude correction circuit 302 when receiving a pattern " . . . 001 . . . " or its inverted pattern " . . . 110 . . . ". The arithmetic logic circuit 311 is a circuit that transmits the signal for allowing the correction current to flow into the output amplitude correction circuit 302 when receiving a pattern " . . . 000 . . . " or its inverted pattern " . . . 111 . . . ".

The output amplitude generator circuit 301 that has received the data 203 to be transmitted outputs the output amplitude which is an optimum de-emphasis suitable for the data 203. In this situation, short current is corrected by the output amplitude correction circuit 302. The current amount that is corrected by the output amplitude correction circuit 302 is determined according to the result calculated by the arithmetic logic circuits 304, 305, 306, 307, 308, 309, 310, and 311 of the data detector circuit 303 that has received the data 203.

The output amplitude correction circuit 302 that allows the correction current to flow upon receiving the result calculated by the arithmetic logic circuits 304, 305, 306, 307, 308, 309, 310, and 311 from the data detector circuit 303 determines the current amount that is corrected by means that is described below in detail.

Figure 9:
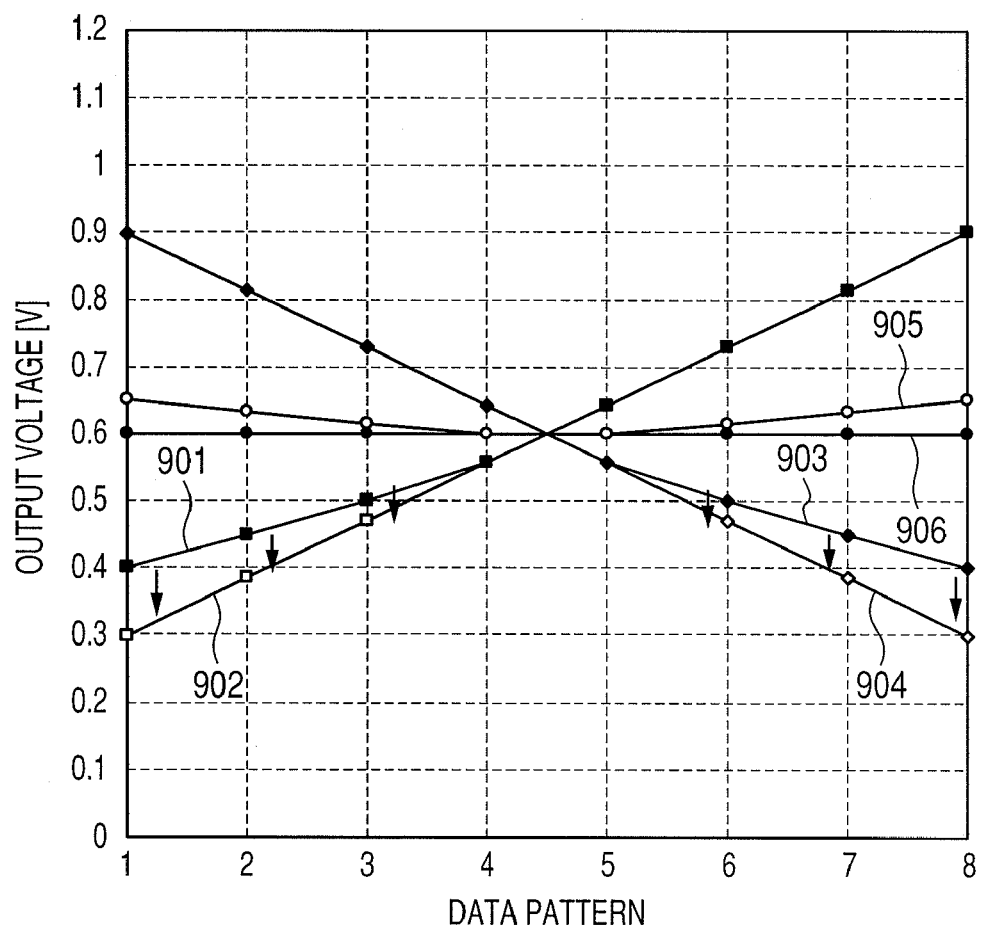
FIG. 9 is a diagram illustrating output voltages before and after having been corrected by a correction current.
Figure 10:
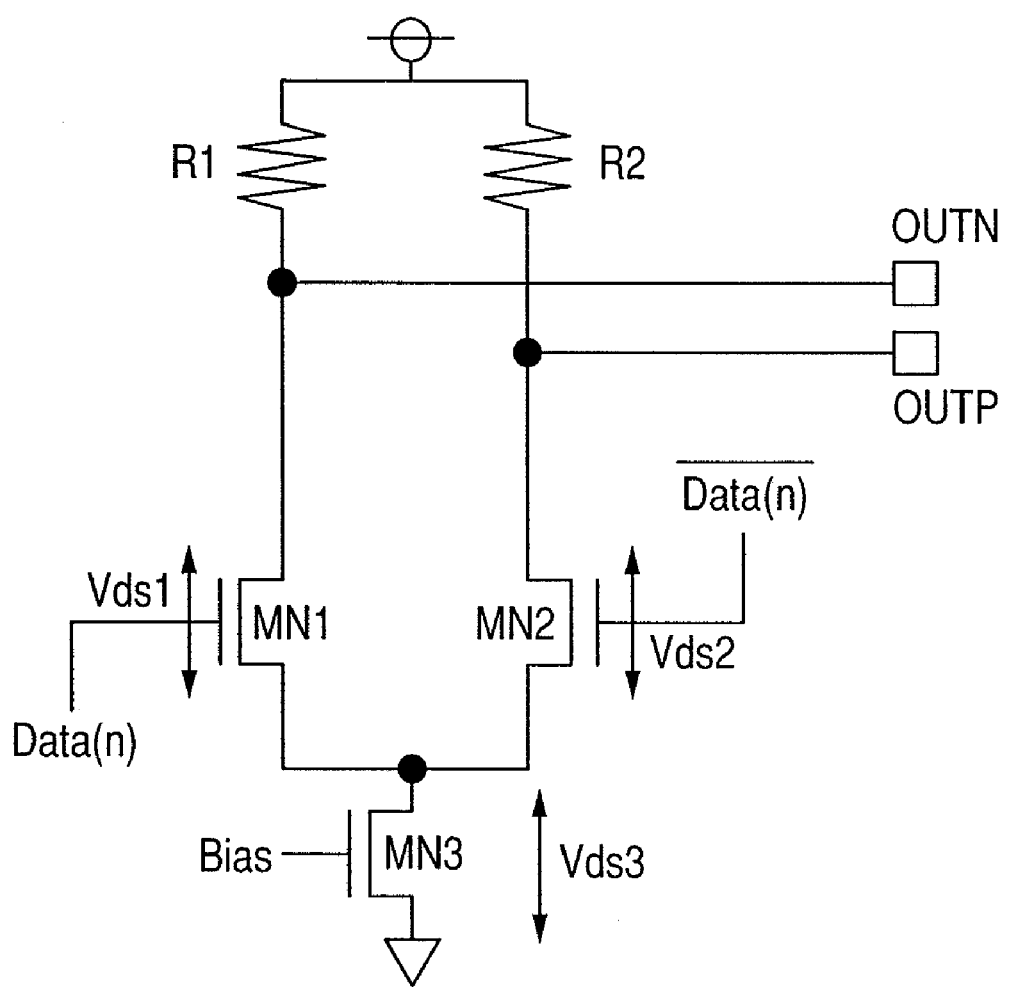
FIG. 10 is a diagram illustrating a CML circuit.

Since the output amplitude generator circuit 301 outputs the eight kinds of output voltages has the de-emphasis function of 3TAP, the output amplitude generator circuit 301 outputs the eight kinds of output voltages corresponding to the $2^3=8$ patterns of the data 203 to be transmitted. FIG. 9 is a diagram showing the output voltages output by the output circuit shown in FIG. 3 before and after the output voltage has been corrected by the correction current. The axis of abscissa in FIG. 9 indicates $2^3=8$ kinds of data signals, and the axis of ordinate represents the output voltage. FIG. 9 also shows a before-correction positive pole side output voltage 901, an after-correction positive pole side output voltage 902, before-correction negative pole side output voltage 903, an after-correction negative pole side output voltage 904, a before-correction common mode potential 905, and an after-correction common mode potential 906. The before-correction positive pole side output voltage 901 indicates plot data that a sufficient current as much as $\Delta Ids3$ does not flow, and VOL (low voltage side output voltage) is not sufficiently lowered because of the device characteristic of the transistor MN2 of the CML circuit as described with reference to FIG. 11. The after-correction positive pole side output voltage 902 indicates plot data that the VOL (low voltage side output voltage) is sufficiently lowered because the correction current is sufficiently supplied from the output amplitude correction circuit 302. The before-correction negative pole side output voltage 903 indicates plot data that a sufficient current as much as $\Delta Ids3$ does not flow in the CML circuit, and the VOL (low voltage side output voltage) is not sufficiently lowered because of the device characteristic of the transistor MN3 of the CML circuit as described with reference to FIG. 11. The after-correction negative pole side output voltage 904 indicates plot data that the VOL (low voltage side output voltage) is sufficiently lowered because the correction current is sufficiently supplied from the output amplitude correction circuit 302. The before-correction common mode potential 905 indicates (before-correction positive pole side output voltage 901+before-correction negative pole side output voltage 903)/2. The after-correction common mode potential 906 indicates (after-correction positive pole side output voltage 902+after-correction negative pole side output voltage 904)/2. The before-correction common mode potential 905 indicates that VOH (high voltage side output voltage) and the VOL (low voltage side output voltage) are unbalanced since the VOLs (low voltage side output voltages) of the before-correction positive pole side output voltage 901 and the before-correction negative pole side output voltage 903 are not sufficiently lowered. That is, the before-correction common mode potential 905 indicates that the common mode noise occurs since the common mode potential fluctuates. The after-correction common mode potential 906 indicates that the fluctuation of the common mode potential is suppressed since the VOLs (lower voltage side output voltages) of the after-correction positive pole side output voltage 902 and the after-correction negative pole side output voltage 904 are sufficiently lowered. That is, the after-correction common mode potential 906 indicates that the common mode noise is suppressed.

In determination of the current amount for correction of the output amplitude correction circuit 302, a difference between the before-correction positive pole side output voltage 901 shown in FIG. 9, which is an output voltage when no correction current flows, and the after-correction positive pole side output voltage 902 shown in FIG. 9, which is an ideal output voltage having no fluctuation of the common mode potential is first calculated in advance. Then, a constant of an MOS of the output amplitude correction circuit 302 can be determined after the device characteristic has been investigated in advance before designing, so that the short current amount can be compensated. The current amount for correction can be determined according to the negative pole side output voltages 903 and 904 as with the before-correction positive pole side output voltages 901 and 902.

Figure 4:
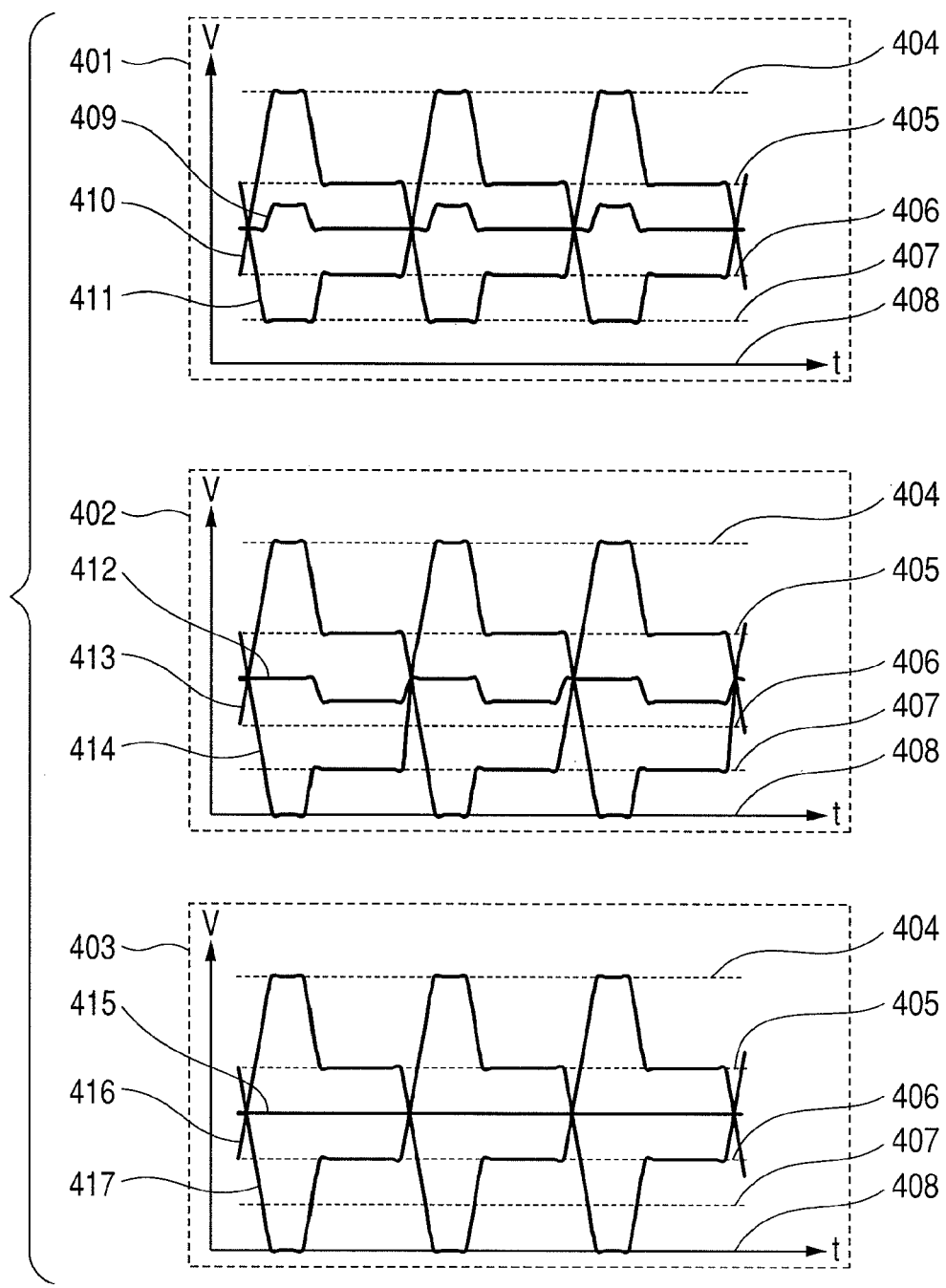
FIG. 4 is a diagram for facilitation of understanding a change in waveforms output from a positive pole and a negative pole of the output circuit.

FIG. 4 is a diagram for facilitation of understanding a change in the waveform that is outputted from the positive pole and the negative pole of the output circuit, due to the correction of a current which flows in the output amplitude generator circuit according to the present invention. In this embodiment, 3TAP is exemplified. However, for facilitation of understanding, it is assumed that the waveform shown in FIG. 4 is a waveform output from the output circuit having the de-emphasis of 2TAP. The axis of ordinate in FIG. 4 represents the output voltage, and the axis of abscissa represents a time. FIG. 4 shows three graphs including a graph 401 when the amplitude is adjusted at a low-speed signal position without conducting the correction of the present invention, a graph 402 when the amplitude is adjusted at a high-speed signal position without conducting the correction of the present invention, and a graph 403 when the correction of the present invention is conducted.

The graph 401 when the amplitude is adjusted at the low-speed signal position without conducting the correction of the present invention is a graph showing the respective waveforms when the amplitude is adjusted to a desired amplitude in the case of a low-speed signal where "0" or "1" continues, without conducting the correction of the present invention. The graph 401 plots a high-voltage side output voltage (VOH) 404, a high-voltage side intermediate output voltage (VOMH) 405, a low-voltage side intermediate output voltage (VOML) 406, a low-voltage side intermediate output voltage (VOML) 407, low-voltage side output voltage (VOL) 408, a common mode potential 409, a positive pole side single waveform 410, and an negative pole side single waveform 411. The graph 401 shows the positive-pole side single waveform 410 and the negative pole side single waveform 411. Those waveforms 410 and 411 are, for example, waveforms when the output amplitude of the data signal of two-bit continuation such as "00110011" is adjusted to the target low-voltage side intermediate output voltage 406. On the other hand, the output amplitude of the data signal such as "01010101" becomes the amplitude of the low-voltage side intermediate output voltage 407 without reaching the target low-voltage side output voltage 408 because the current is short by ΔIds3 shown in FIG. 11. Accordingly, the common mode potential 409 is different between the high-speed signal position that changes from "0" to "1" or from "1" to "0", and the low-speed signal position where "0" or "1" continues. That is, the common mode potential 409 causes the common mode noise to occur.

The graph 402 when the amplitude is adjusted at the high-speed signal position without conducting the correction of the present invention is a graph showing the respective waveforms when the amplitude is adjusted to a desired amplitude in the case of the high-speed signal that changes from "0" to "1" or from "1" to "0", without conducting the correction of the present invention. The graph 402 plots the high-voltage side output voltage (VOH) 404, the high-voltage side intermediate output voltage (VOMH) 405, the low-voltage side intermediate output voltage (VOML) 406, the low-voltage side intermediate output voltage (VOML) 407, the low-voltage side output voltage (VOL) 408, a common mode potential 412, positive pole side single waveform 413, and an negative pole side single waveform 414. The graph 402 shows the positive-pole side single waveform 413 and the negative pole side single waveform 414. However, those waveforms are, for example, waveforms when the output amplitude of the data signal such as "01010101" is adjusted to the target low-voltage side output voltage 408. On the other hand, the output amplitude of the data signal of two-bit continuation such as "00110011" is lower in the potential than the target low-voltage side intermediate output voltage 406, and becomes the amplitude of the low-voltage side intermediate output voltage 407 because the current is excessive by ΔIds3 shown in FIG. 11. Accordingly, the common mode potential 412 is different between the high-speed signal position and the low-speed signal position. That is, the common mode potential 412 causes the common mode noise to occur.

Figure 11:
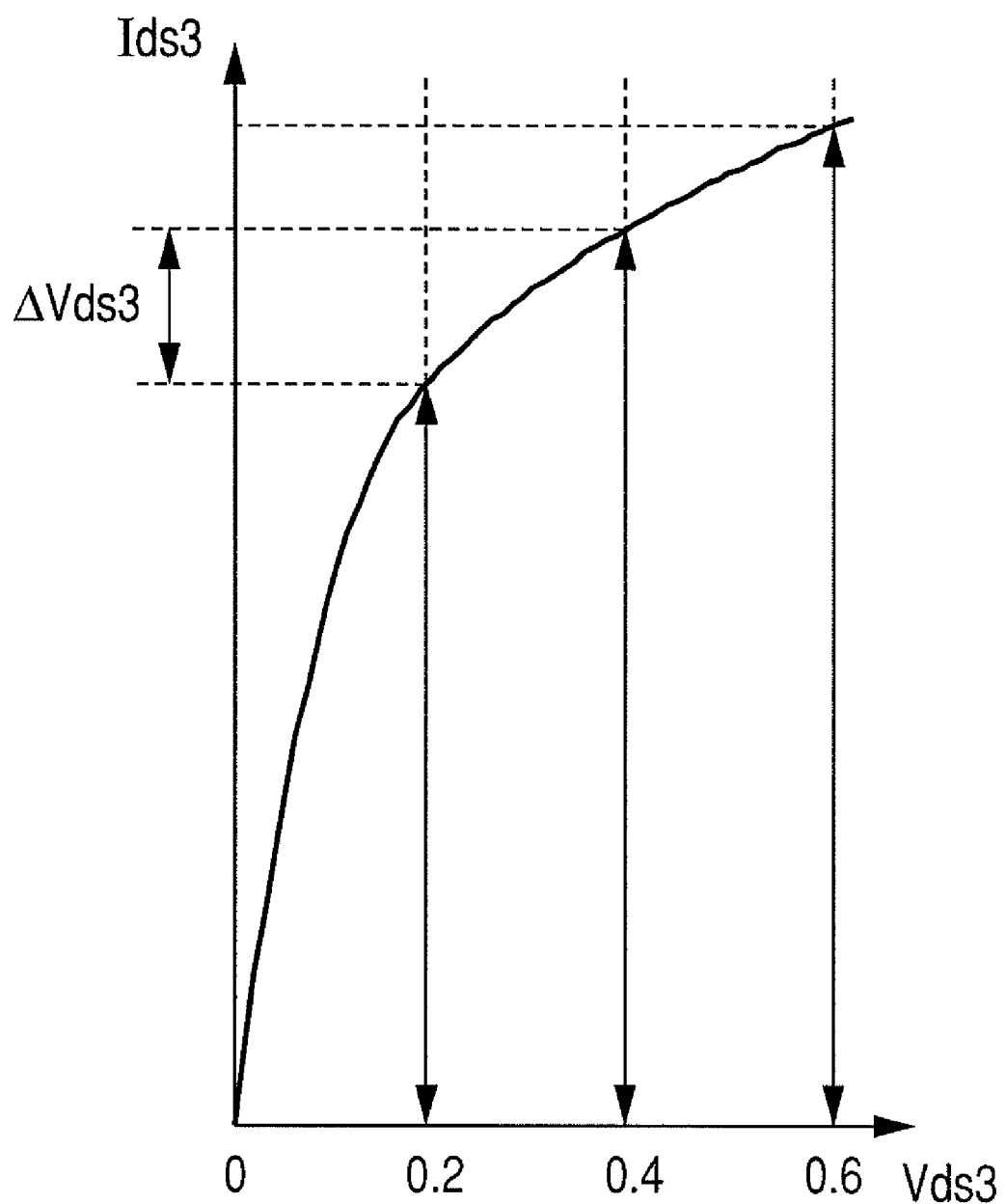
FIG. 11 is a diagram for explaining an unsaturated region of a current source MOS.

The graph 403 when the correction of the present invention is conducted is a graph showing the respective waveforms when the correction for ΔIds3 shown in FIG. 11 is conducted. The graph 403 plots the high-voltage side output voltage (VOH) 404, the high-voltage side intermediate output voltage (VOMH) 405, the low-voltage side intermediate output voltage (VOML) 406, the low-voltage side intermediate output voltage (VOML) 407, the low-voltage side output voltage (VOL) 408, a common mode potential 415, a positive pole side single waveform 416, and an negative pole side single waveform 417. As indicated by the positive pole side single waveform 416 and the negative pole side single waveform 417, the correction of the present invention is conducted so that the output amplitude of the high-speed signal is adjusted to the target low-voltage side output voltage (VOL) 408, and the output amplitude of the low-speed signal is adjusted to the target low-voltage side intermediate output voltage 4 (VOML) 406. As a result, fluctuation of the common mode potential 415 at the high-speed signal position and the low-speed signal position can be suppressed. That is, the common mode noise can be suppressed.

Second Embodiment

Figure 5:
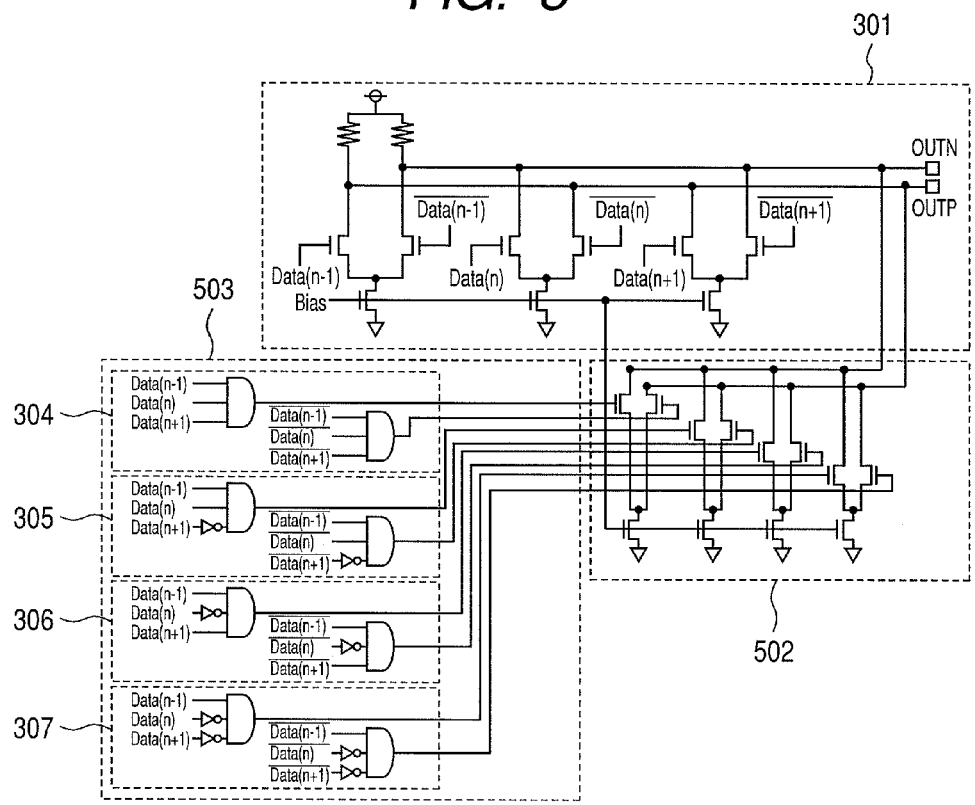
FIG. 5 is a diagram illustrating an example of an output circuit according to a second embodiment.

FIG. 5 is a diagram showing an example of the output circuit 204 according to a second embodiment. The output circuit shown in FIG. 3 has the eight arithmetic logic circuits with respect to each of the positive pole side output voltage and the negative pole side output voltage for the purpose of correcting the positive pole side output voltage and the negative pole side output voltage. On the other hand, the output circuit shown in FIG. 5 has arithmetic logic circuits that are half the number of those in the output circuit shown in FIG. 3. Hereinafter, differences from FIG. 3 will be described in detail.

The output circuit shown in FIG. 5 includes the output amplitude generator circuit 301, an output amplitude correction circuit 502, a data detector circuit 503, the arithmetic logic circuit 304, the arithmetic logic circuit 305, the arithmetic logic circuit 306, and the arithmetic logic circuit 307.

The data detector circuit 503 is configured by the arithmetic logic circuit 304, the arithmetic logic circuit 305, the arithmetic logic circuit 306, and the arithmetic logic circuit 307. The data detector circuit 503 thus includes four arithmetic logic circuits so as to correct the positive pole side output voltage (VOP) and its inverted negative pole side output voltage (VON) when outputting the low-voltage side output voltage (VOL) with respect to four kinds of data signals.

In the output circuit of FIG. 3, the high-voltage side and low-voltage side output voltages can be adjusted by the correction current with respect to all of the available patterns 203 of the signal to be transmitted. However, when ΔIds3 that is a deviation of the design value causes a problem in not the low-speed signal but the high-speed signal, the correction current added by ΔIds3 can be allowed to flow into an electrode, which is an output of the lower voltage side of the positive pole and the negative pole, in the case of the high speed signal. Therefore, as shown in FIG. 5, the number of arithmetic logic circuits can be reduced to half the number of those in FIG. 3. Accordingly, the power consumption of the output circuit and the circuit scale can be reduced.

Third Embodiment

Figure 6:
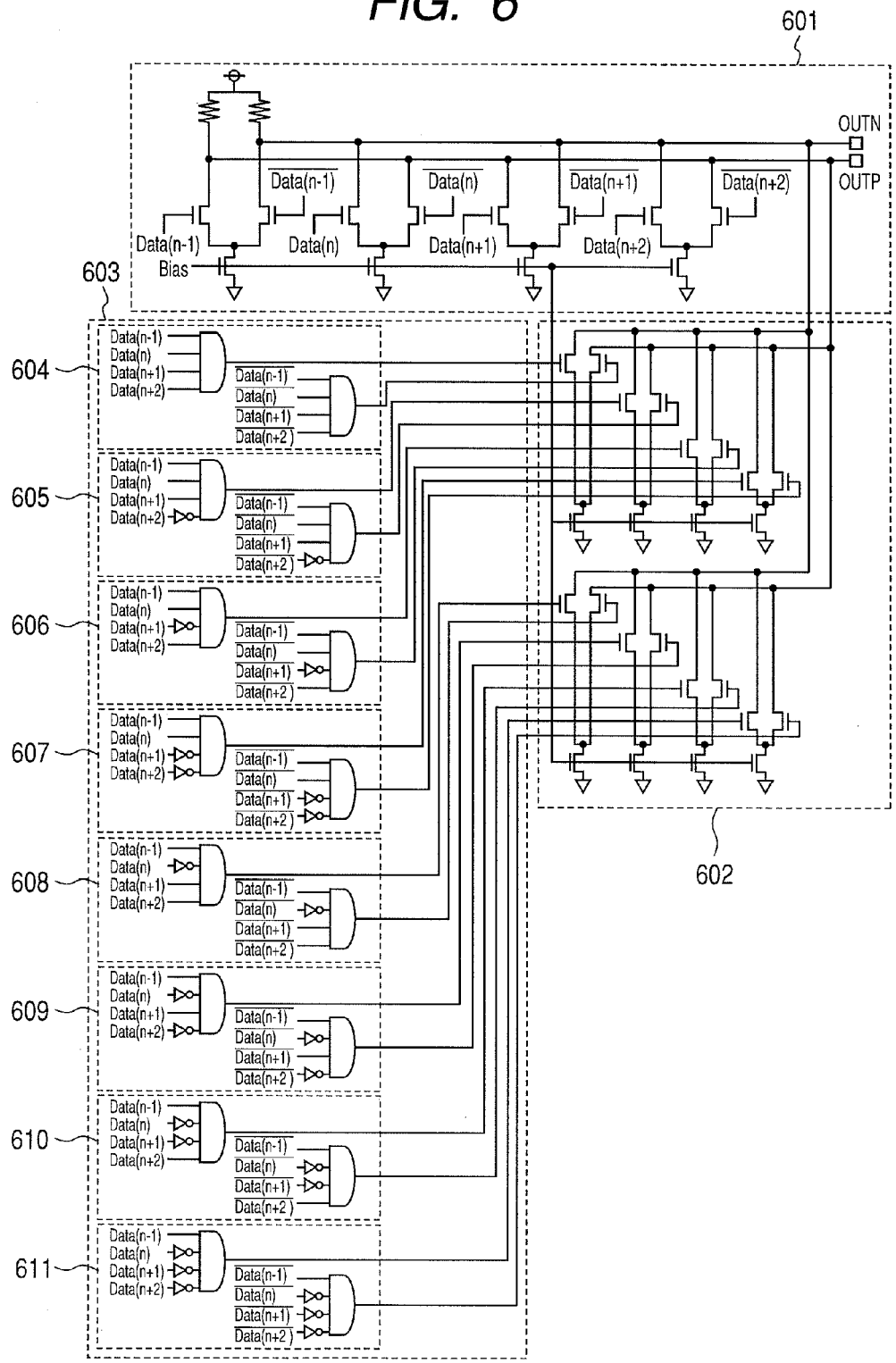
FIG. 6 is a diagram illustrating an example of an output circuit according to a third embodiment.

FIG. 6 is a diagram showing an example of the output circuit 204 according to a third embodiment. The output circuit shown in FIG. 5 has the de-emphasis function of 3TAP whereas the output circuit shown in FIG. 6 has the de-emphasis function of 4TAP, which is a difference therebetween. Hereinafter, differences from FIG. 5 will be described in detail.

The output circuit shown in FIG. 6 includes an output amplitude generator circuit 601, an output amplitude correction circuit 602, a data detector circuit 603, an arithmetic logic circuit 604, an arithmetic logic circuit 605, an arithmetic logic circuit 606, an arithmetic logic circuit 607, an arithmetic logic circuit 608, an arithmetic logic circuit 609, an arithmetic logic circuit 610, and an arithmetic logic circuit 611.

The output amplitude generator circuit 601 has the de-emphasis function of 4TAP which is added with circuits for receiving Data (n+2) and Data (n−2) so as to respond to a data signal of 4 bits. Other configurations are identical with those of the output amplitude generator circuit 301.

The output amplitude correction circuit 602 is configured by eight circuits so as to enable eight kinds of corrections with respect to $2^4=16$ kinds of data signals.

The data detector circuit 603 for 4TAP has circuits of the number twice as large as the number of the data detector circuit 503 for 3TAP shown in FIG. 5 because there are $2^4=16$ kinds of data signals. The other configurations are identical with those of the data detector circuit 503.

The arithmetic logic circuit 604 is a circuit that transmits the signal for allowing the correction current to flow into the output amplitude correction circuit 602 when receiving a pattern " . . . 1111 . . . " or its inverted pattern " . . . 0000 . . . ". The arithmetic logic circuit 605 is a circuit that transmits the signal for allowing the correction current to flow into the output amplitude correction circuit 602 when receiving a pattern " . . . 1110 . . . " or its inverted pattern " . . . 0001 . . . ". The arithmetic logic circuit 606 is a circuit that transmits the signal for allowing the correction current to flow into the output amplitude correction circuit 602 when receiving a pattern " . . . 1101 . . . " or its inverted pattern " . . . 0010 . . . ". The arithmetic logic circuit 607 is a circuit that transmits the signal for allowing the correction current to flow into the output amplitude correction circuit 602 when receiving a pattern " . . . 1100 . . . " or its inverted pattern " . . . 0011 . . . ". The arithmetic logic circuit 608 is a circuit that transmits the signal for allowing the correction current to flow into the output amplitude correction circuit 602 when receiving a pattern " . . . 1011 . . . " or its inverted pattern " . . . 0100 . . . ". The arithmetic logic circuit 609 is a circuit that transmits the signal for allowing the correction current to flow into the output amplitude correction circuit 602 when receiving a pattern " . . . 1010 . . . " or its inverted pattern " . . . 0101 . . . ". The arithmetic logic circuit 610 is a circuit that transmits the signal for allowing the correction current to flow into the output amplitude correction circuit 602 when receiving a pattern " . . . 1001 . . . " or its inverted pattern " . . . 0110 . . . ". The arithmetic logic circuit 611 is a circuit that transmits the signal for allowing the correction current to flow into the output amplitude correction circuit 602 when receiving a pattern " . . . 1000 . . . " or its inverted pattern " . . . 0111 . . . ".

In the above description, the circuits added when changing from 3TAP to 4TAP are exemplified by FIGS. 5 and 6. When the circuits corresponding to 2, 5, 6, . . . , N TAP are designed, the same change as that described above is enabled.

Fourth Embodiment

Figure 7:
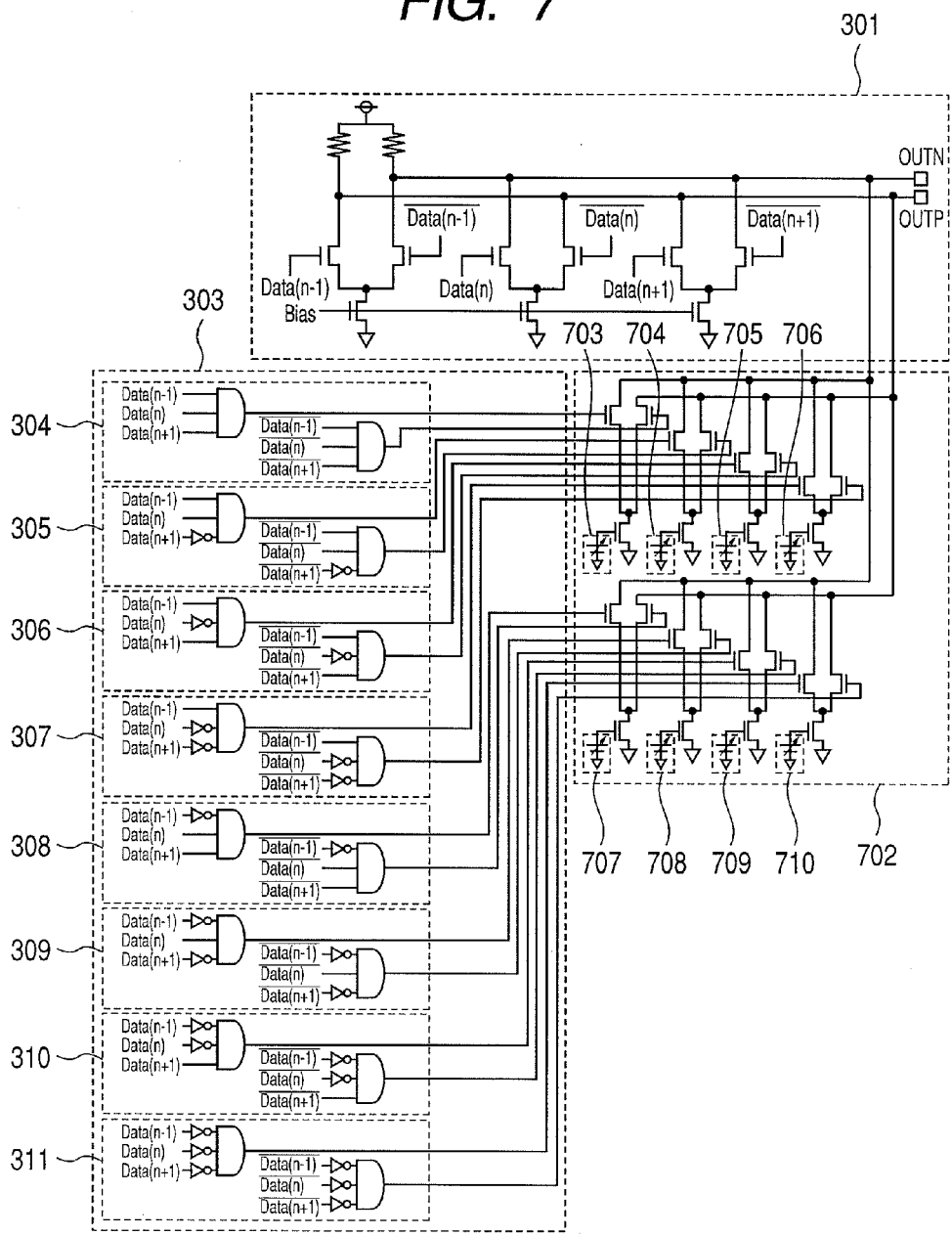
FIG. 7 is a diagram illustrating an example of an output circuit according to a fourth embodiment.

FIG. 7 is a diagram showing an example of the output circuit 204 according to a fourth embodiment. Hereinafter, differences from FIG. 3 will be described in detail.

The gate voltage of the output amplitude correction circuit 302 shown in FIG. 3 is the same as the gate voltage of the output amplitude generator circuit 301, and the correction amount is determined by determination of the MOS circuit constant when the circuit is designed. On the other hand, the gate voltage of an output amplitude correction circuit 702 shown in FIG. 7 are connected to voltage control voltage sources 703, 704, 705, 706, 707, 708, 709, and 710, and the correction amount can be adjusted even after the design has been conducted. For example, the arithmetic logic circuit 304 within the data detector circuit 303 receives the data signal " . . . 111 . . . " or " . . . 000 . . . ", and transmits correction instruction information to the output amplitude correction circuit 702. The output amplitude correction circuit 702 makes the correction current flow. In this case, when the output amplitude correction circuit 702 is going to change the correction current to flow, the gate voltage can be adjusted by the voltage control voltage sources 703, 704, 705, 706, 707, 708, 709, and 710. The other configurations are identical with those of the output amplitude correction circuit 302.

Fifth Embodiment

Figure 8:
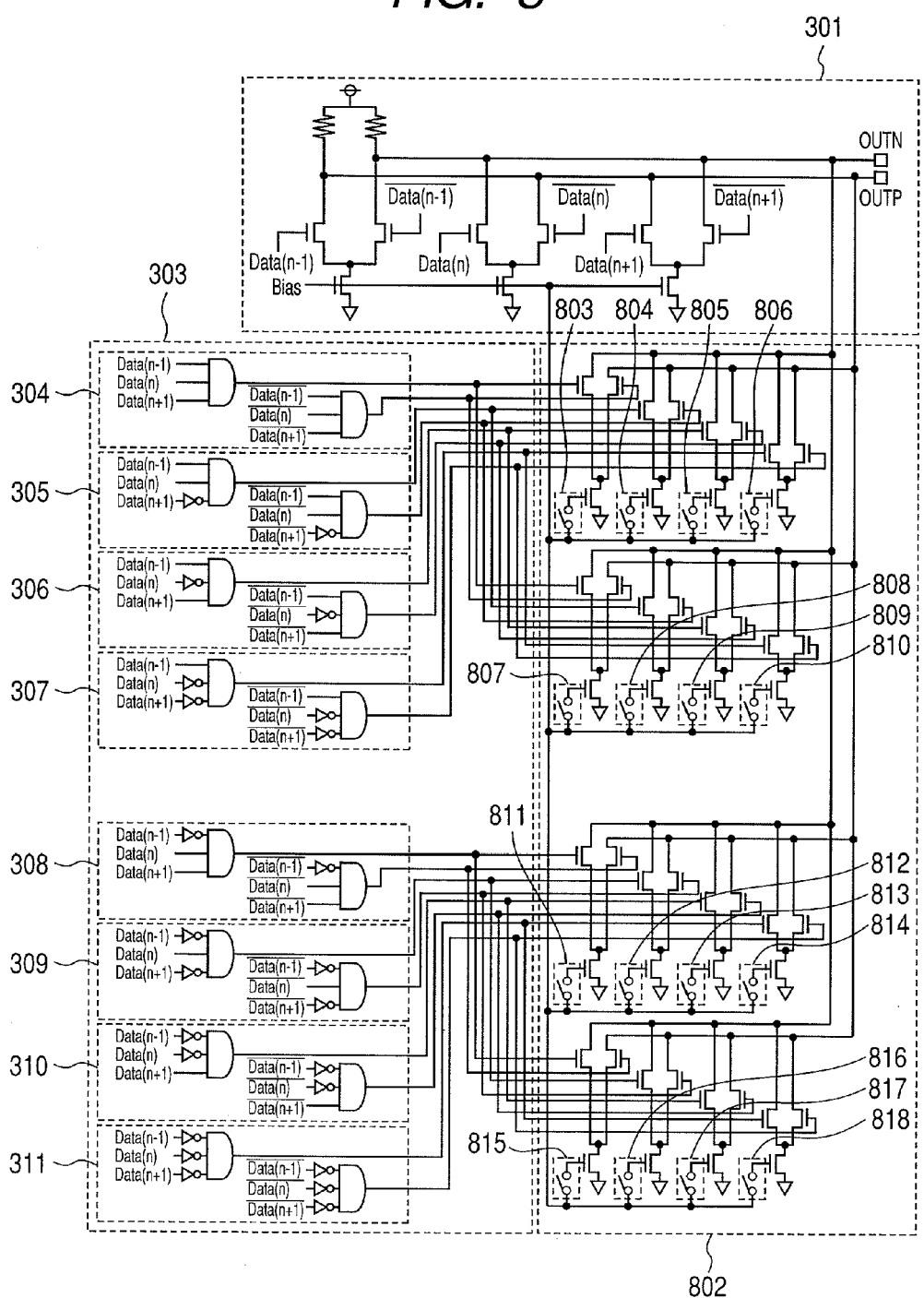
FIG. 8 is a diagram illustrating an example of an output circuit according to a fifth embodiment.

FIG. 8 is a diagram showing an example of the output circuit 204 according to a fifth embodiment. Hereinafter, differences from FIG. 3 will be described in detail.

The arithmetic logic circuit 304 within the data detector circuit 303 shown in FIG. 3 transmits the correction instruction information to one correction circuit within the output amplitude correction circuit 302. On the other hand, the arithmetic logic circuit 304 within the data detector circuit 303 shown in FIG. 8 can transmit the correction instruction information to two correction circuits including a correction circuit with a switch 803 and a correction circuit with a switch 807, which can change over the on/off state of the current source MOS within the output amplitude correction circuit 802, which is different from the arithmetic logic circuit 304 within the data detector circuit 303 shown in FIG. 3. For example, the adjustment of four kinds of correction current amounts that both of the switch 803 and the switch 807 are on, the switch 803 is on and the switch 807 is off, the switch 803 is off and the switch 807 is on, and both of the switch 803 and the switch 807 are off can be executed.

Similarly, the arithmetic logic circuit 305 within the data detector circuit 303 shown in FIG. 8 can transmit the correction instruction information to two correction circuits including a correction circuit with a switch 804 and a correction circuit with a switch 808, which can change over the on/off state of the current source MOS within the output amplitude correction circuit 802.

The other configurations are identical with those of the output amplitude correction circuit 302.

Sixth Embodiment

Figure 12:
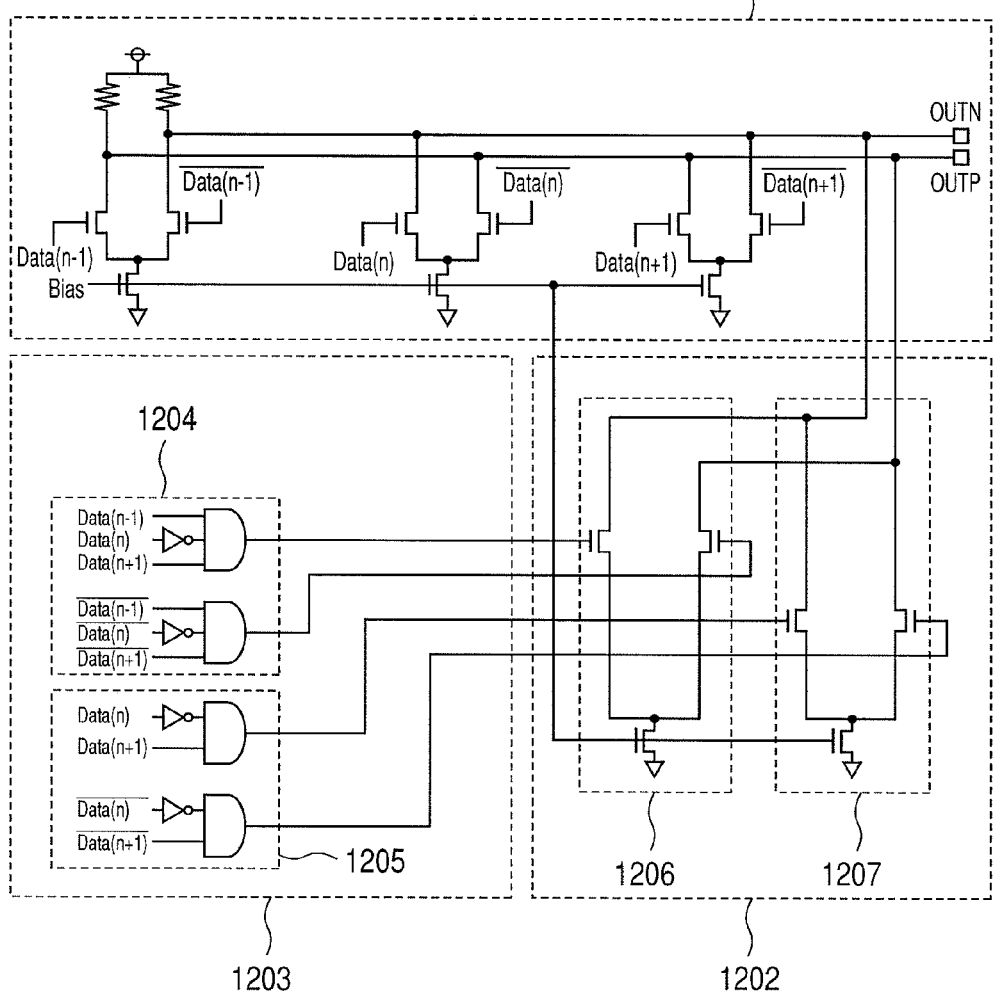
FIG. 12 is a diagram illustrating an example of an output circuit according to a sixth embodiment.

FIG. 12 is a diagram showing an example of the output circuit 204 according to a sixth embodiment. Hereinafter, differences from FIG. 3 will be described in detail.

The output circuit shown in FIG. 12 includes the output amplitude generator circuit 301, an output amplitude correction circuit 1202, a data detector circuit 1203, an arithmetic logic circuit 1204, and an arithmetic logic circuit 1205. The output circuit shown in FIG. 3 includes eight CMLs in the output amplitude correction circuit 302, and 16 arithmetic logic circuits in the data detector circuit 303, and conducts different correction on eight kinds of data signal patterns. On the other hand, the output circuit of FIG. 12 has two CMLs in the output amplitude correction circuit 1202 and four arithmetic logic circuits in the data detector circuit 1203, which is different from the output circuit shown in FIG. 3. The number of circuits is reduced, thereby enabling reduction in the circuit area and a reduction in the power consumption.

The output amplitude correction circuit 1202 includes CMLs 1206 and 1207. The data detector circuit 1203 includes the arithmetic logic circuits 1204 and 1205. The arithmetic logic circuit 1204 transmits a signal for allowing the correction current to flow to the output amplitude correction circuit 1202 when receiving the data signal " . . . 010 . . . " or " . . . 101 . . . ". The arithmetic logic circuit 1204 transmits a signal for allowing the correction current to flow to the output amplitude correction circuit 1202 when receiving the data signal " . . . 01 . . . " or " . . . 10 . . . "

The data detector circuit 1203 conducts three kinds of corrections described below upon receiving eight kinds of data signal patterns, that is, " . . . 000 . . . ", " . . . 001 . . . ", " . . . 010 . . . ", " . . . 011 . . . ", " . . . 100 . . . ", " . . . 101 . . . ", " . . . 110 . . . " " . . . 111 . . . ". Upon receiving " . . . 010 . . . " or " . . . 101 . . . ", both of the arithmetic logic circuits 1204 and 1205 transmit the signal for allowing the correction current to flow to the output amplitude correction circuit 1202, and both of CMLs 1206 and 1207 of the output amplitude correction circuit 1202 turn on. Upon receiving any one of " . . . 001 . . . ", " . . . 011 . . . ", " . . . 100 . . . ", and " . . . 110 . . . ", the arithmetic logic circuit 1205 transmits the signal for allowing the correction current to flow to the output amplitude correction circuit 1202, the CML 1207 of the output amplitude correction circuit 1202 turns on, and the CML 1206 is off. Upon receiving " . . . 000 . . . " or " . . . 111 . . . ", since there is no signal that is outputted from the arithmetic logic circuits 1204 and 1205, both of the CMLs 1206 and 1207 of the output amplitude correction circuit 1202 turn off. In this case, the output circuit shown in FIG. 12 represents correcting means in case where ΔIds3 that is a deviation from the design value causes a problem in not the low-speed signal but the high-speed signal as in the output circuit shown in FIG. 5. In this case, the transmission loss becomes larger in the higher-speed data signal, in this example, " . . . 010 . . . " and " . . . 101 . . . ". Therefore, the signal amplitude is made larger as the speed of the data signal is higher. Accordingly, because ΔIds3 becomes larger with the higher speed data signal, there is a need to increase the correction current for suppressing the common mode noise. Accordingly, in order to make the added current larger than the middle speed data signal (001, 011, 100, 110), the CML 1207 turns on to allow the correction current to flow in the case of the middle speed data signal whereas the CML 1206 also turns on so that a larger correction current flows in the case of the high speed data signal. As a result, the common mode noise can be suppressed.

The other configurations are identical with those in the output circuit shown in FIG. 3.

The advantages obtained when the CML is used in the output amplitude correction circuit 1202 will be described below. The CML is used in the circuit 301 for generating the output amplitude within the output circuit, and the output amplitude is current-controlled. When the output amplitude correction circuit 1202 is configured by the CML that is the same circuit system, the variation of the circuit for generating the output amplitude and the output amplitude correction circuit can be reduced. Further, since the correction current amount can be controlled by the current source MOS, substantially the same amount of correction is conducted on the positive pole side data signal and the negative pole side data signal.

The present invention has been described with the embodiments in detail above. However, the present invention is not limited to the above configurations, but can be modified without departing from the subject matter of the invention.

What is claimed is:

1. A serial output circuit, comprising:
a first differential circuit that inputs data to be transmitted to differential inputs, and provides a positive pole and a negative pole as outputs;
a de-emphasis circuit that is connected to the positive pole and the negative pole;
a second differential circuit that has one of differential outputs connected to the positive pole and the other differential output connected to the negative pole;
a first pattern detector circuit that has an output connected to one of differential inputs of the second differential circuit, and detects a first data pattern from the data to be transmitted; and
a second pattern detector circuit that has an output connected to the other differential input of the second differential circuit, and detects a pattern, which is an inversion of the first data pattern, from the input data to be transmitted.

2. The serial output circuit according to claim 1, wherein the first data pattern includes a change of data from "0" to "1" or from "1" to "0".

3. The serial output circuit according to claim 2, wherein the first data pattern includes a change of data to "0" subsequent to the change from "0" to "1", or a change of data to "1" subsequent to the change from "1" to "0".

4. The serial output circuit according to claim 2, further comprising:

a third differential circuit that has one of differential outputs connected to the positive pole, and the other differential output connected to the negative pole;

a third pattern detector circuit that has an output connected to one of differential inputs of the third differential circuit, and detects a second data pattern from the data to be transmitted; and a fourth pattern detector circuit that has an output connected to the other differential input of the third differential circuit, and detects a pattern that is an inversion of the second data pattern from the data to be transmitted, wherein the second data pattern includes a change of data to "0" subsequent to the change of data from "0" to "1", or a change of data to "1" subsequent to the change of data from "1" to "0".

5. The serial output circuit according to claim 1, wherein the second differential circuit is a current mode logic circuit.

6. A semiconductor device, comprising:
a first integrated circuit; and
a second integrated circuit that is connected to the first integrated circuit by a serial transmission,
wherein the first integrated circuit includes:
a first differential circuit that inputs data to be transmitted to differential inputs, and provides a positive pole and a negative pole as outputs;
a de-emphasis circuit that is connected to the positive pole and the negative pole;
a second differential circuit that has one of differential outputs connected to the positive pole and the other differential output connected to the negative pole;
a first pattern detector circuit that has an output connected to one of differential inputs of the second differential circuit, and detects a first data pattern from the data to be transmitted; and
a second pattern detector circuit that has an output connected to the other differential input of the second differential circuit, and detects a pattern, which is an inversion of the first data pattern, from the input data to be transmitted.

7. The semiconductor device according to claim 6, wherein the first data pattern includes a change of data from "0" to "1" or from "1" to "0".

8. The semiconductor device according to claim 7, wherein the first data pattern includes a change of data to "0" subsequent to the change from "0" to "1", or a change of data to "1" subsequent to the change from "1" to "0".

9. The semiconductor device according to claim 7, further comprising:
a third differential circuit that has one of differential outputs connected to the positive pole, and the other differential output connected to the negative pole;
a third pattern detector circuit that has an output connected to one of differential inputs of the third differential circuit, and detects a second data pattern from the data to be transmitted; and
a fourth pattern detector circuit that has an output connected to the other differential input of the third differential circuit, and detects a pattern that is an inversion of the second data pattern from the data to be transmitted,
wherein the second data pattern includes a change of data to "0" subsequent to the change of data from "0" to "1", or a change of data to "1" subsequent to the change of data from "1" to "0".

10. The semiconductor device according to claim 6, wherein the second differential circuit is a current mode logic circuit.

11. A serial transmission method, comprising:
preparing a first differential circuit that inputs data to be transmitted to differential inputs, and provides a positive pole and a negative pole as outputs;
preparing a de-emphasis circuit that is connected to the positive pole and the negative pole;
preparing a second differential circuit that has one of differential outputs connected to the positive pole and the other differential output connected to the negative pole;
inputting a signal to one of differential inputs of the second differential circuit when the data to be transmitted is a given pattern; and
inputting a signal to the other differential input of the second differential circuit when the data to be transmitted is a pattern that is an inversion of the given data pattern.

12. The serial transmission method according to claim 11, wherein the given pattern includes a change of data from "0" to "1" or from "1" to "0".

13. The serial transmission method according to claim 12, wherein the given pattern includes a change of data to "0" subsequent to the change from "0" to "1", or a change of data to "1" subsequent to the change from "1".

* * * * *